(12) United States Patent
Hirose et al.

(10) Patent No.: US 7,494,743 B2
(45) Date of Patent: Feb. 24, 2009

(54) ANODE AND BATTERY

(75) Inventors: Takakazu Hirose, Fukushima (JP);
Masayuki Iwama, Fukushima (JP);
Isamu Konishiike, Fukushima (JP);
Kenichi Kawase, Fukushima (JP)

(73) Assignee: Sony Corporation, Tokyo (JP)

( * ) Notice: Subject to any disclaimer, the term of this patent is extended or adjusted under 35 U.S.C. 154(b) by 51 days.

(21) Appl. No.: 11/533,970

(22) Filed: Sep. 21, 2006

(65) Prior Publication Data
US 2007/0072078 A1    Mar. 29, 2007

(30) Foreign Application Priority Data
Sep. 29, 2005    (JP)    ............... P2005-285104

(51) Int. Cl.
*H01M 4/58*    (2006.01)
(52) U.S. Cl. ............... 429/218.1; 429/209; 429/231.95; 429/217; 429/235
(58) Field of Classification Search ............... 429/218, 429/218.1, 209, 231.95, 217, 235
See application file for complete search history.

(56) References Cited

U.S. PATENT DOCUMENTS

| 6,051,340 A | 4/2000 | Kawakami et al. |
| 6,432,579 B1 | 8/2002 | Tsuji et al. |
| 2003/0003362 A1* | 1/2003 | Leising et al. ............ 429/231.1 |

FOREIGN PATENT DOCUMENTS

| JP | 08-050922 | 2/1996 |
| JP | 11-135115 | 5/1999 |
| JP | 2948205 | 7/1999 |
| JP | 2004327309 A * | 11/2004 |

\* cited by examiner

*Primary Examiner*—Jane Rhee
(74) *Attorney, Agent, or Firm*—Sonnenschein Nath & Rosenthal LLP

(57) ABSTRACT

An anode capable of relaxing internal stress and thereby preventing deformation and a battery using it are provided. An anode provided with an anode active material layer is formed on an anode current collector. The anode active material layer has active material particles containing silicon (Si) as an element, and at least some of the active material particles contain a polymer component in the particle.

11 Claims, 4 Drawing Sheets

US 7,494,743 B2

ANODE AND BATTERY

CROSS REFERENCES TO RELATED APPLICATIONS

The present invention contains subject matter related to Japanese Patent Application JP 2005-285104 filed in the Japanese Patent Office on Sep. 29, 2005, the entire contents of which being incorporated herein by reference.

BACKGROUND OF THE INVENTION

1. Field of the Invention

The present invention relates to an anode containing silicon (Si) as an element and a battery using it.

2. Description of the Related Art

In recent years, as mobile devices have been sophisticated and multi-functionalized, a higher capacity of secondary batteries as a power source for these mobile devices has been demanded. As a secondary battery to meet such a demand, there is a lithium ion secondary battery. However, since graphite is used for the anode in the lithium ion secondary battery in practical use currently, the battery capacity thereof is in a saturated state and thus it is difficult to attain a significant high capacity thereof. Therefore, it is considered to use silicon or the like for the anode. Recently, forming an anode active material layer on an anode current collector by vapor-phase deposition method or the like has been reported (for example, refer to Japanese Unexamined Patent Application Publication Nos. H08-50922 and H11-135115, and Japanese Patent Publication No. 2948205). Silicon or the like is largely expanded and shrunk due to charge and discharge, and thus there has been a disadvantage that the cycle characteristics are lowered due to pulverization. However, when using the vapor-phase deposition method or the like, such pulverization can be prevented, and the anode current collector and the anode active material layer can be integrated. In the result, electron conductivity in the anode becomes extremely favorable, and high performance both in the capacity and the cycle life is expected.

SUMMARY OF THE INVENTION

However, there has been a disadvantage that even in the foregoing anode in which the anode current collector and the anode active material layer are integrated as above, when charge and discharge are repeated, the anode active material layer is dropped due to intense expansion and shrinkage of the anode active material layer, leading to lowering of cycle characteristics.

In view of the foregoing, in the invention, it is desirable to provide an anode capable of preventing deformation of the anode active material layer by relaxing internal stress and a battery using the anode.

According to an embodiment of the invention, there is provided an anode provided with an anode active material layer on an anode current collector, in which the anode active material layer has active material particles containing silicon as an element, and at least some of the active material particles contain a polymer component in the particle.

According to an embodiment of the invention, there is provided a battery including a cathode, an anode, and an electrolyte, in which in the anode, an anode active material layer having active material particles containing silicon as an element is provided on an anode current collector, and at least some of the active material particles contain a polymer component in the particle.

In the anode according to the embodiment of the invention, the polymer component is contained in the active material particles. Therefore, internal stress caused by expansion and shrinkage of the active material particles can be relaxed, and deformation of the anode active material layer and peeling of the anode active material layer from the anode current collector can be prevented. In the result, in the battery using such an anode according to the embodiment of the invention, battery characteristics such as cycle characteristics can be improved.

Other and further objects, features and advantages of the invention will appear more fully from the following description.

DETAILED DESCRIPTION OF THE PREFERRED EMBODIMENTS

A description will be given of embodiments of the invention in detail with reference to the drawings.

First Embodiment

Figure 1:
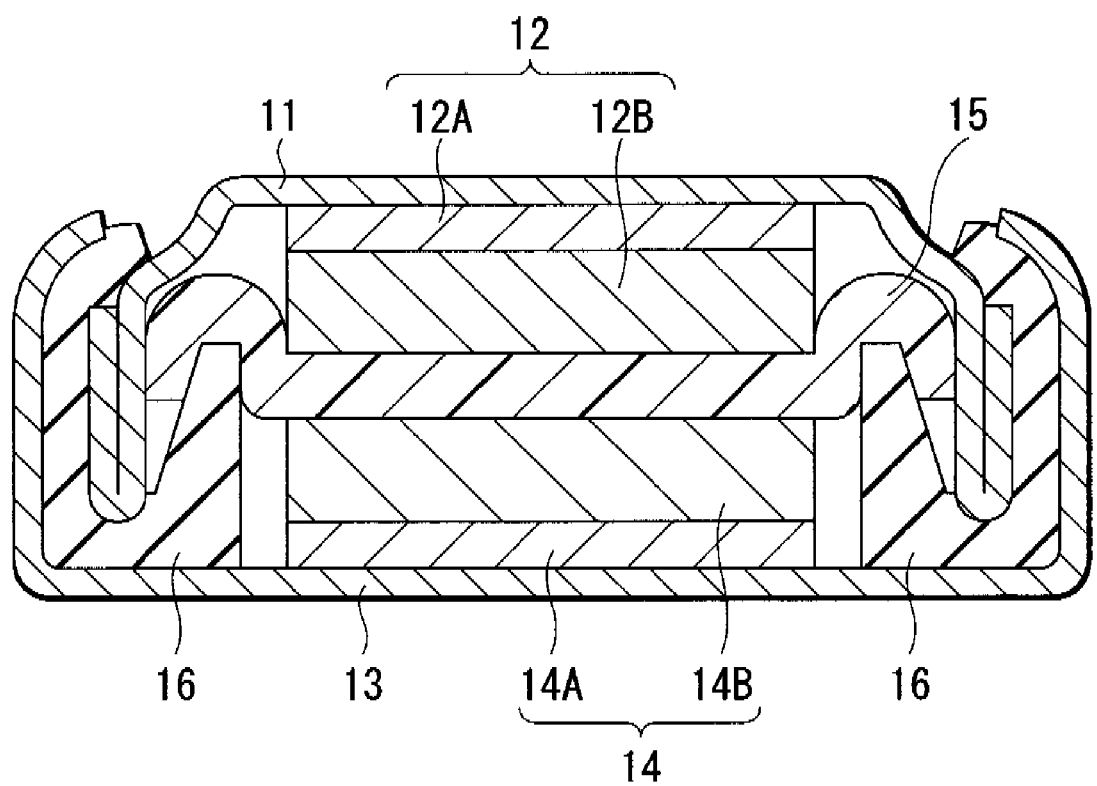
FIG. 1 is a cross section showing a structure of a secondary battery according to a first embodiment of the invention.

FIG. 1 shows a structure of a secondary battery according to a first embodiment of the invention. The secondary battery is a so-called coin type secondary battery in which an anode 12 contained in a package cup 11 and a cathode 14 contained in a package can 13 are layered with a separator 15 in between. Peripheral edges of the package cup 11 and the package can 13 are hermetically sealed by being caulked with an insulating gasket 16. The package cup 11 and the package can 13 are respectively made of a metal such as stainless and aluminum (Al).

The anode 12 has, for example, an anode current collector 12A and an anode active material layer 12B provided on the anode current collector 12A.

The anode current collector 12A is preferably made of a metal material containing at least one metal element not forming an intermetallic compound with lithium (Li). When the intermetallic compound is formed with lithium, the anode is expanded and shrunk due to charge and discharge, structure is destroyed, and current collectivity is lowered. In addition, ability to support the anode active material layer 12B deteriorates. In this specification, the metal materials include an alloy composed of two or more metal elements or an alloy composed of one or more metal elements and one or more metalloid elements, in addition to simple substances of metal elements. As a metal element not forming an intermetallic compound with lithium, for example, copper (Cu), nickel (Ni), titanium (Ti), iron (Fe), or chromium (Cr) can be cited.

The anode current collector 12A preferably contains a metal element being alloyed with the anode active material layer 12B. Thereby, contact characteristics between the anode active material layer 12B and the anode current collector 12A can be improved. As a metal element not forming an intermetallic compound with lithium and being alloyed with the anode active material layer 12B, in the case that the anode active material layer 12B contains silicon as an element as described later, for example, copper, nickel, or iron can be cited. These elements are preferable in view of strength and conductivity as well.

The anode current collector 12A may be formed of a single layer or a plurality of layers. In the latter case, the layer contacting with the anode active material layer 12B may be made of a metal material being alloyed with silicon, and other layers may be made of other metal material. Further, the anode current collector 12A is preferably made of a metal material composed of at least one of metal elements not forming an intermetallic compound with lithium except for the interface with the anode active material layer 12B.

The face of the anode current collector 12A on which the anode active material layer 12B is provided is preferably roughened. Thereby, contact characteristics with the anode active material layer 12B can be improved.

The anode active material layer 12B has active material particles containing silicon as an element. Silicon has a high ability to insert and extract lithium, and provides a high energy density. The active material particles may contain silicon in the form of a simple substance, an alloy, a compound, or a mixture of two or more of these forms.

Figure 2:
FIG. 2 is an SEM photograph showing a particle structure of an anode active material layer according to the secondary battery shown in FIG. 1.
Figure 3:
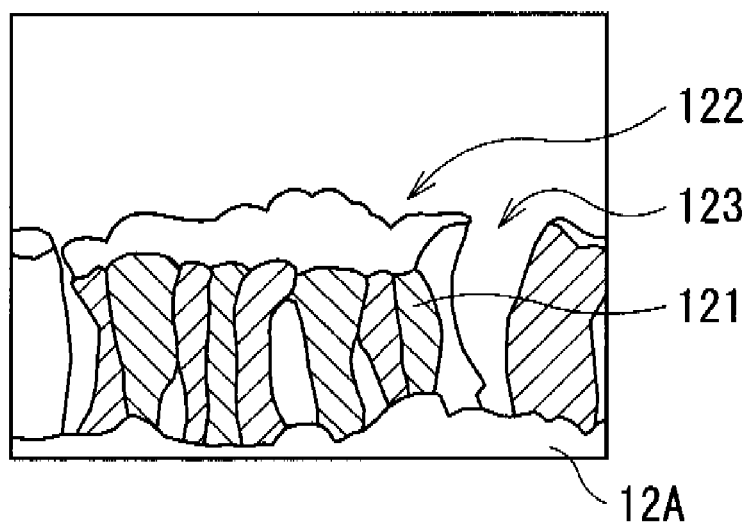
FIG. 3 is a model showing the particle structure of the anode active material layer according to the secondary battery shown in FIG. 1.

FIG. 2 is a Scanning Electron Microscope (SEM) photograph showing a particle structure on cross section in the thickness direction of the anode active material layer 12B. FIG. 3 shows a model of the particle structure. Active material particles 121 are formed by, for example, vapor-phase deposition method, and grown in the thickness direction. At least some of the active material particles 121 aggregate to form a plurality of secondary particles 122. Each active material particle 121 in each secondary particle 122 is not simply adjacent to each other, but at least part thereof is bonded with each other. Each secondary particle 122 is formed, for example, by charge and discharge, and is separated from each other by a groove 123. The groove 123 nearly reaches the anode current collector 12A.

Further, at least some of the active material particles 121 contain a polymer component in the particle. Thereby, in the secondary battery, internal stress caused by expansion and shrinkage of the active material particles 121 due to charge and discharge can be relaxed. The polymer component herein means a component composing at least part of a polymer. The polymer component may be a polymer itself, or may be a partial element generated by decomposition of a polymer. Any polymer, for example, a fluorocarbon resin such as polyvinylidene fluoride, polyimide, polyethylene, polystyrene, polyvinyl chloride or the like may be used. Specially, a fluorocarbon resin such as polyvinylidene fluoride or polyimide is preferable, since thereby higher effects can be obtained.

Such polymer component is preferably scattered in the active material particles 121 since thereby stress can be further relaxed. Such polymer component can be scattered by using a polymer as a raw material together with a raw material of silicon when, for example, the active material particles 121 are formed by vapor-phase deposition method.

The particle structure of the anode active material layer 12B may be observed by SEM or by Scanning Ion Microscope (SIM). A cross section thereof is preferably cut out by Focused Ion Beam (FIB), a microtome or the like. The polymer component can be analyzed by detecting a peak derived from a polymer or a peak derived from a bonding included in a polymer by, for example, Time-of-Flight Secondary Ion Mass Spectrometry (TOF-SIM). As a bonding included in a polymer, for example, in a fluorocarbon resin, C—F bonding, F—C—F bonding or the like can be cited. In polyimide, N—C bonding, N=C bonding, N—C—O bonding, N=C—O bonding or the like can be cited. In polyvinyl chloride, H—C—Cl bonding, C—Cl bonding or the like can be cited.

The anode active material layer 12B is preferably alloyed with the anode current collector 12A in at least part of the interface with the anode current collector 12A. Specifically, on the interface, the element of the anode current collector 12A is preferably diffused in the anode active material layer 12B, or the element of the anode active material layer 12B is preferably diffused in the anode current collector 12A, or the both elements thereof are preferably diffused in each other. Thereby, even when the anode active material layer 12B is expanded and shrunk due to charge and discharge, the anode active material layer 12B is prevented from being dropped from the anode current collector 12A.

The cathode 14 has, for example, a cathode current collector 14A and a cathode active material layer 14B provided on the cathode current collector 14A. Arrangement is made so that the cathode active material layer 14B side is opposed to the anode active material layer 12B. The cathode current collector 14A is made of, for example, aluminum, nickel, stainless or the like.

The cathode active material layer 14B contains, for example, as a cathode active material, one or more cathode materials capable of inserting and extracting lithium. The cathode active material layer 14B may contain an electrical conductor such as a carbon material and a binder such as polyvinylidene fluoride according to needs. As a cathode material capable of inserting and extracting lithium, for example, a lithium-containing metal complex oxide expressed by a general formula, $Li_xMIO_2$ is preferable, since the lithium-containing metal complex oxide can generate a high voltage and has a high density, leading to a higher capacity of the secondary battery. MI represents one or more transition metals, and is preferably, for example, at least one of cobalt and nickel. x varies according to charge and discharge states of the battery, and is generally in the range of $0.05 \leq x \leq 1.10$. As a specific example of such a lithium-containing metal complex oxide, $LiCoO_2$, $LiNiO_2$ or the like can be cited.

The separator 15 separates the anode 12 from the cathode 14 prevents current short circuit due to contact of the both electrodes, and lets through lithium ions. The separator 15 is made of, for example, polyethylene or polypropylene.

An electrolytic solution, which is a liquid electrolyte, is impregnated in the separator 15. The electrolytic solution contains, for example, a solvent and an electrolyte salt dissolved in the solvent. The electrolytic solution may contain an additive according to needs. As a solvent, for example, a nonaqueous solvent such as ethylene carbonate, propylene carbonate, dimethyl carbonate, diethyl carbonate, and ethyl methyl carbonate can be cited. One of the solvents may be used singly, or two or more thereof may be used by mixing.

As an electrolyte salt, for example, a lithium salt such as $LiPF_6$, $LiCF_3SO_3$, and $LiClO_4$ can be cited. One of the electrolyte salts may be used singly, or two or more thereof may be used by mixing.

The secondary battery can be fabricated as follows, for example.

First, the anode active material layer 12B containing silicon as an element is formed on the anode current collector 12A by, for example, vapor-phase deposition method. As vapor-phase deposition method, for example, physical deposition method or chemical deposition method can be cited. Specifically, any of vacuum vapor deposition method, sputtering method, ion plating method, laser ablation method, CVD (Chemical Vapor Deposition) method, and thermal spraying method may be used. As a raw material, polymer is used together with a material containing silicon. Thereby, the active material particles 121 containing silicon as an element are grown while taking a polymer component into the particles. As a material containing silicon, any of a silicon simple substance, a silicon alloy, and a silicon compound may be used. The form of the material containing silicon is selected according to the composition of the active material particles 121 to be formed. In addition to the material containing silicon and the polymer, other material may be used as a raw material according to the composition of the active material particles 121 to be formed. After the anode active material layer 12B is formed, heat treatment is performed under the vacuum atmosphere or under the non-oxidizing atmosphere if necessary.

Next, the cathode active material layer 14B is formed on the cathode current collector 14A. For example, a cathode active material, and if necessary an electrical conductor and a binder are mixed, the cathode current collector 14A is coated with the mixture, and the resultant is compression-molded. Subsequently, the anode 12, the separator 15, and the cathode 14 are layered, the lamination is contained between the package cup 11 and the package can 13, an electrolytic solution is injected, and the resultant is caulked, and thereby a battery is assembled. After the battery is assembled, for example, by charging and discharging, the groove 123 is formed in the anode active material layer 12B, and the anode active material layer 12B is divided into the secondary particles 122 in which the plurality of active material particles 121 are aggregated.

In the secondary battery, when charged, for example, lithium ions are extracted from the cathode 14 and inserted in the anode 12 through the electrolytic solution. When discharged, for example, lithium ions are extracted from the anode 12 and inserted in the cathode 14 through the electrolytic solution. As charge and discharge are performed, the active material particles 121 are largely expanded and shrunk. However, stress is relaxed by the polymer component contained in the particles, and deformation of the anode active material layer 12B and peeling of the anode active material layer 12B from the anode current collector 12A are prevented.

As above, according to this embodiment, the polymer component is contained in at least some of the active material particles 121 Therefore, internal stress due to expansion and shrinkage associated with charge and discharge can be relaxed, and deformation of the anode active material layer 12B and peeling of the anode active material layer 12B from the anode current collector 12A can be prevented. Therefore, battery characteristics such as cycle characteristics can be improved.

Second Embodiment

Figure 4:
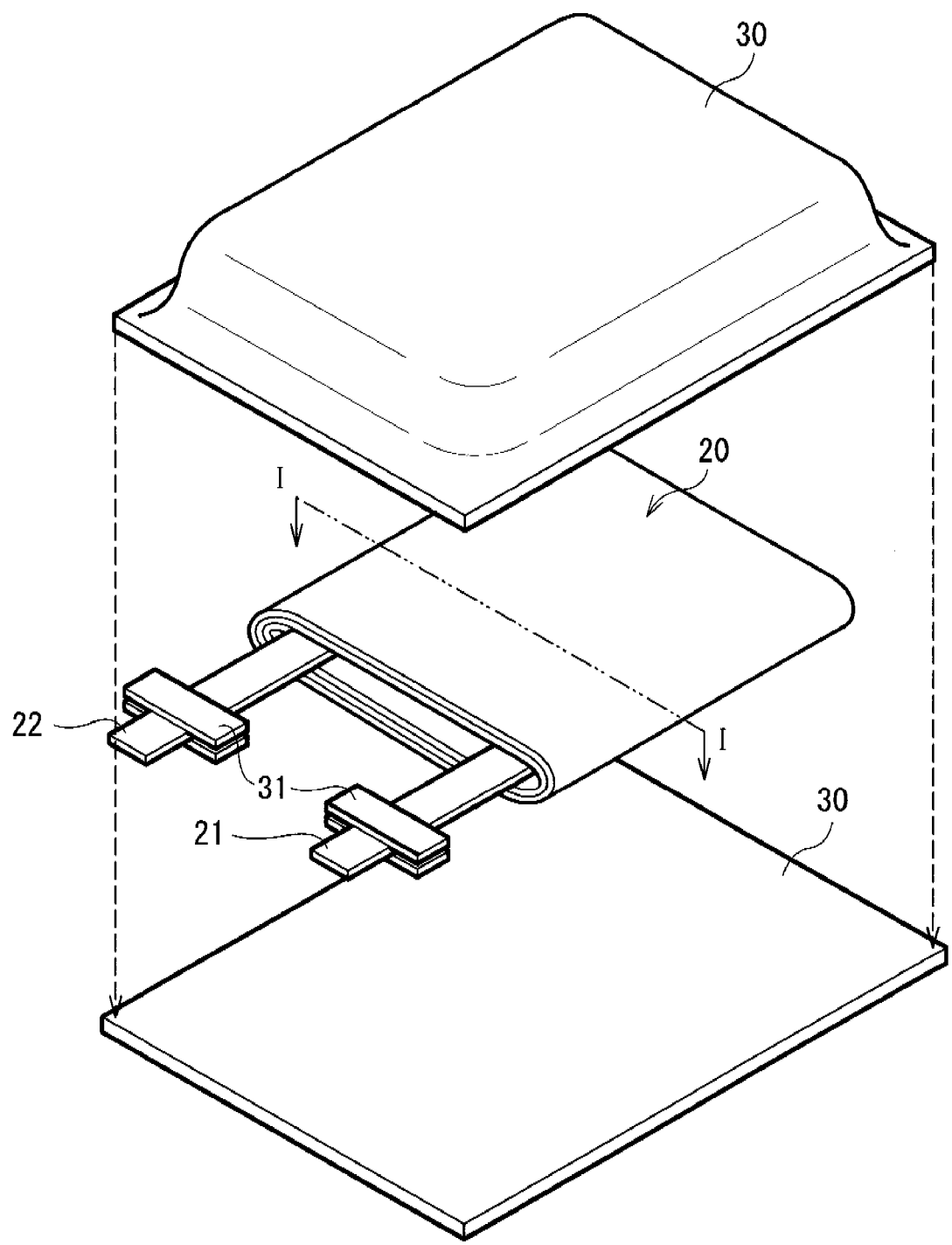
FIG. 4 is an exploded perspective view showing a structure of a secondary battery according to a second embodiment of the invention.

FIG. 4 shows a structure of a secondary battery according to a second embodiment of the invention. In the secondary battery, a spirally wound electrode body 20 on which leads 21 and 22 are attached is contained inside a film package member 30. Thereby, a small, lightweight, and thin secondary battery can be obtained.

The leads 21 and 22 are respectively directed from inside to outside of the package member 30 in the same direction, for example. The leads 21 and 22 are respectively made of, for example, a metal material such as aluminum, copper, nickel, and stainless, and are in a state of a thin plate or mesh, respectively.

The package member 30 is made of a rectangular aluminum laminated film in which, for example, a nylon film, an aluminum foil, and a polyethylene film are bonded together in this order. The package member 30 is, for example, arranged so that the polyethylene film side and the spirally wound electrode body 20 are opposed to each other, and the respective outer edges thereof are contacted to each other by fusion bonding or an adhesive. Adhesive films 31 to protect from outside air entering are inserted between the package member 30 and the leads 21 and 22. The adhesive film 31 is made of a material having contact characteristics to the leads 21 and 22, for example, a polyolefin resin such as polyethylene, polypropylene, modified polyethylene, and modified polypropylene.

The package member 30 may be made of a laminated film having other structure, a high molecular weight film such as polypropylene, or a metal film, instead of the foregoing aluminum laminated film.

Figure 5:
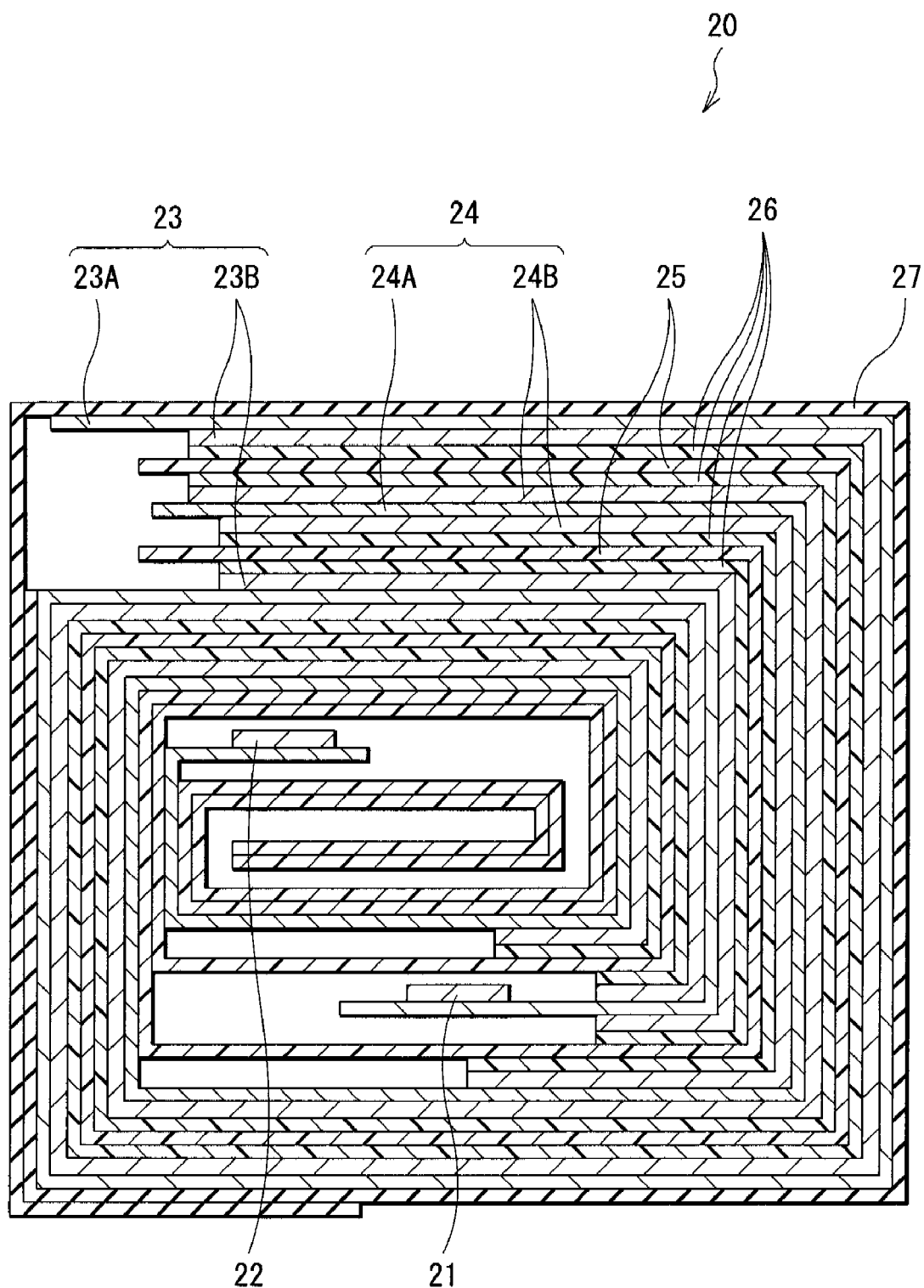
FIG. 5 is a cross section showing a structure taken along line I-I of the secondary battery shown in FIG. 4.

FIG. 5 shows a cross sectional structure taken along line I-I of the spirally wound electrode body 20 shown in FIG. 4. In the spirally wound electrode body 20, an anode 23 and a cathode 24 are layered with a separator 25 and an electrolyte layer 26 in between and wound. The outermost periphery thereof is protected by a protective tape 27.

The anode 23 has a structure in which an anode active material layer 23B is provided on the both faces of an anode current collector 23A. The cathode 24 also has a structure in which a cathode active material layer 24B is provided on the both faces of a cathode current collector 24A. Arrangement is made so that the cathode active material layer 24B is opposed to the anode active material layer 23B. Structures of the anode current collector 23A, the anode active material layer 23B, the cathode current collector 24A, the cathode active material layer 24B, and the separator 25 are similar to those of the anode current collector 12A, the anode active material layer 12B, the cathode current collector 14A, the cathode active material layer 14B, and the separator 15 respectively described above. The particle structure of the anode active material layer 23B is determined at the central portion which is a portion of the spirally wound electrode body 20 where the curvature is not large.

The electrolyte layer 26 is made of a so-called gelatinous electrolyte in which an electrolytic solution is held in a holding body made of a high molecular weight compound. The gelatinous electrolyte is preferable, since a high ion conductivity can be thereby obtained, and liquid leakage of the battery can be thereby prevented. A structure of the electrolytic solution is similar to that of the first embodiment. As a high molecular weight material, for example, polyvinylidene fluoride can be cited.

The secondary battery can be manufactured, for example, as follows.

First, after the anode 23 and the cathode 24 are formed in the same manner as in the first embodiment, the electrolyte layer 26 in which the electrolytic solution is held in the holding body is formed on the anode 23 and the cathode 24. Next, the leads 21 and 22 are attached to the anode current collector 23A and the cathode current collector 24A. Subsequently, the anode 23 and the cathode 24 formed with the electrolyte layer 26 are layered with the separator 25 in between and is wound. The protective tape 27 is adhered to the outermost periphery of the lamination to form the spirally wound electrode body 20. After that, for example, the spirally wound electrode body 20 is sandwiched between the package members 30, and outer edges of the package members 30 are contacted by thermal fusion bonding or the like to enclose the spirally wound electrode body 20. The adhesive film 31 is inserted between the leads 21 and 22 and the package member 30

Otherwise the secondary battery may be fabricated as follows. First, in the same manner as in the first embodiment, the anode 23 and the cathode 24 are formed. After that, the leads 21 and 22 are attached thereto. Next, the anode 23 and the cathode 24 are layered with the separator 25 in between and wound. The protective tape 27 is adhered to the outermost periphery thereof, and a spirally wound body as a precursor of the spirally wound electrode body 20 is formed. Subsequently, the spirally wound body is sandwiched between the package member 30, and the outermost peripheries except for one side are thermally fusion-bonded to obtain a pouched state. After that, an electrolytic composition containing an electrolytic solution, a monomer as a raw material for the high molecular weight compound, a polymerization initiator, and if necessary other material such as a polymerization inhibitor is injected into the package member 30 After that, the opening of the package member 30 is thermally fusion-bonded and hermetically sealed in the vacuum atmosphere. Next, the resultant is heated to polymerize the monomer to obtain a high molecular weight compound. Thereby, the gelatinous electrolyte layer 26 is formed.

After the battery is assembled as above, the groove 123 and the secondary particle 122 are formed in the anode active material layer 23B by, for example, charging and discharging in the same manner as in the first embodiment.

The secondary battery works similarly to in the first embodiment, and has effects similar to those of the first embodiment.

EXAMPLES

Further, specific examples of the invention will be hereinafter described in detail with reference to the drawings.

Examples 1 to 13

Secondary batteries having a structure shown in FIGS. 4 and 5 were fabricated. First, the anode active material layer 23B containing silicon being about 9 μm thick was deposited on the anode current collector 23A made of a copper foil with roughened surface being 12 μm thick by vacuum vapor deposition method. Then, a polymer component was co-vapor-deposited together with silicon to make the active material particles 121 contain the polymer component. As a raw material of silicon, an ingot made of a silicon simple substance was used. A raw material of the polymer component was changed in Examples 1 to 13 as shown in Table 1. Specifically, in Examples 1 to 5, polyvinylidene fluoride was used. In Examples 6 to 10, polyimide was used. In Example 11, polystyrene was used. In Example 12 polyethylene was used. In Example 13, polyvinyl chloride was used. In Examples 1 to 10, by changing the applied voltage, the deposition amount of the polymer component was changed. Next, heat treatment was performed in the reduced pressure atmosphere.

For the formed anode 23 of Examples 1 to 13, the cross section in the thickness direction was cut out by FIB and observed by SEM. It was confirmed that the plurality of active material particles 121 were grown in the thickness direction in all examples. Further, for the cut cross section, the polymer component was analyzed by TOF-SIMS. It was confirmed that the polymer component existed in all examples. Further, for the anode 23 of Examples 1 to 10, the ratio between silicon and the polymer component in the active material particles 121 was analyzed by Energy Dispersive X-ray Fluorescence Spectrometer (EDX). In the analysis, the area ratio was obtained by mapping silicon and fluoride as an element of polyvinylidene fluoride, or by mapping silicon and nitrogen as an element of polyimide in the range of 1 μm×1 μm for part of the cut cross section. The obtained results are shown in Table 1.

Further, 92 parts by weight of lithium cobaltate ($LiCoO_2$) powder being 5 μm in an average particle diameter as a cathode active material, 3 parts by weight of carbon black as an electrical conductor, and 5 parts by weight of polyvinylidene fluoride as a binder were mixed. The mixture was put in N-methyl-2-pyrrolidone as a disperse medium to obtain slurry. Next, the cathode current collector 24A made of an aluminum foil being 15 μm thick was coated with the slurry, which was dried and pressed to form the cathode active material layer 24B.

Subsequently, 37.5 wt % of ethylene carbonate, 37.5 wt % of propylene carbonate, 10 wt % of vinylene carbonate, and 15 wt % of $LiPF_6$ were mixed to prepare an electrolytic solution. The both faces of the anode 33 and the cathode 34 were respectively coated with a mixture obtained by mixing 30 parts by weight of the electrolytic solution and 10 parts by weight of polyvinylidene fluoride as a block copolymer with weight average molecular weight of 0.6 million to form the electrolyte layer 26.

After that, the leads 21 and 22 were attached, the anode 23 and the cathode 24 were layered with the separator 25 in between and wound, and the resultant was enclosed in the package member 30 made of an aluminum laminated film. Thereby, the secondary battery was assembled.

As Comparative example 1 relative to Examples 1 to 13, a secondary battery was fabricated in the same manner as in Examples 1 to 13, except that the polymer was not used as a raw material and the polymer component was not vapor-deposited when the anode active material layer 23B was deposited.

For the fabricated secondary batteries of Examples 1 to 13 and Comparative example 1, charge and discharge test was performed at 25 deg C., and the discharge capacity retention ratio at the 31st cycle to the second cycle was obtained. Charge was performed until the battery voltage reached 4.2 V at a constant current density of 1 $mA/cm^2$, and then performed until the current density reached 0.05 $mA/cm^2$ at a constant voltage of 4.2 V. Discharge was performed until the battery voltage reached 2.5 V at a constant current density of 1 $mA/cm^2$. Charge was performed so that the utilization ratio of the capacity of the anode 23 was 90%, and metal lithium was not precipitated on the anode 23. The capacity retention ratio was calculated as a ratio of the discharge capacity at the 31st cycle to the discharge capacity at the second cycle, that is, as (discharge capacity at the 31st cycle/ the discharge capacity at the second cycle)×100. The obtained results are shown in Table 1.

Further, for the secondary batteries of Examples 1 to 13 and Comparative example 1, the batteries were disassembled after the 31st cycle and the anode 23 in the discharged state was taken out. The cross section in the thickness direction in the central portion of the anode 23 was observed by SEM. It was confirmed that in all examples and the comparative example, the plurality of active material particles 121 aggre gated and formed the secondary particle 122 as shown in FIGS. 2 and 3.

TABLE 1

|  | Raw material of polymer component | Polymer component:Si (area ratio) | Discharge capacity retention ratio (%) |
|---|---|---|---|
| Example 1 | Polyvinylidene fluoride | 1:20 | 91 |
| Example 2 |  | 1-10 | 92 |
| Example 3 |  | 1:5 | 91 |
| Example 4 |  | 1:2 | 90 |
| Example 5 |  | 1:1 | 89 |
| Example 6 | Polyimide | 1:20 | 89 |
| Example 7 |  | 1:10 | 90 |
| Example 8 |  | 1:5 | 88 |
| Example 9 |  | 1:2 | 87 |
| Example 10 |  | 1:1 | 86 |
| Example 11 | Polystyrene | — | 83 |
| Example 12 | Polyethylene | — | 82 |
| Example 13 | Polyvinyl chloride | — | 82.5 |
| Comparative example 1 | None | — | 79 |

As shown in Table 1, according to Examples 1 to 13, the discharge capacity retention ratio could be improved compared to Comparative example 1. In particular, in Examples 1 to 10, high effects could be obtained. That is, it was found that when the polymer component was contained in the active material particles 121 internal stress due to charge and discharge could be relaxed and battery characteristics such as cycle characteristics could be improved. It was found that as a polymer component, a polyvinylidene fluoride or a polyimide was preferable.

While the invention has been described with reference to the embodiments and the examples, the invention is not limited to the foregoing embodiments and the foregoing examples, and various modifications may be made. For example, in the foregoing embodiments and the foregoing examples, descriptions have been given of the case using the electrolytic solution as a liquid electrolyte or the so-called gelatinous electrolyte. However, other electrolyte may be used. As other electrolyte, a solid electrolyte having ion conductivity, a mixture of a solid electrolyte and an electrolytic solution, or a mixture of a solid electrolyte and a gelatinous electrolyte can be cited.

For the solid electrolyte, for example, a high molecular weight solid electrolyte in which an electrolyte salt is dispersed in a high molecular weight compound having ion conductivity, or an inorganic solid electrolyte composed of ion conductive glass, ionic crystal or the like can be used. As a high molecular weight compound of the high molecular weight solid electrolyte, for example, an ether high molecular weight compound such as polyethylene oxide and a cross-linked body containing polyethylene oxide, an ester high molecular weight compound such as poly methacrylate, or an acrylate high molecular weight compound can be used singly, by mixing, or by copolymerization. As an inorganic solid electrolyte, a substance containing lithium nitride, lithium phosphate or the like can be used.

Further, in the foregoing embodiments and the foregoing examples, descriptions have been given of the coin-type secondary battery and the spirally wound laminated type secondary battery. However, the invention can be similarly applied to a secondary battery having other shape such as a cylinder type secondary battery, a square type secondary battery, a button type secondary battery, a thin secondary battery, a large secondary battery, and a laminated type secondary battery. Further, the invention can be applied to primary batteries in addition to the secondary batteries.

It should be understood by those skilled in the art that various modifications, combinations, sub-combinations and alternations may occur depending on design requirements and other factors insofar as they are within the scope of the appended claims or the equivalents thereof.

What is claimed is:

1. An anode comprising:
   an anode current collector; and
   an anode active material layer on the anode current collector,
   wherein,
   the anode active material layer comprises active material particles containing silicon (Si), and
   at least some of the active material particles contain a polymer component in the active material particle, the polymer component effectively relaxing stress caused by expansion and shrinkage of the active material particles due to charge and discharge of current therethrough and preventing deformation of the anode active material layer and peeling of the anode active material layer from the anode current collector.

2. The anode according to claim 1, wherein the active material particles are formed by vapor-phase deposition method by using a polymer as part of raw materials.

3. The anode according to claim 1, wherein the active material particles contain at least one of a fluorocarbon resin and a polyimide as the polymer component.

4. The anode according to claim 1, wherein the active material particles contain a polyvinylidene fluoride as the polymer component.

5. The anode according to claim 1, wherein the anode active material layer is alloyed with the anode current collector in at least part of an interface with the anode current collector.

6. A battery comprising:
   a cathode;
   an anode; and
   an electrolyte,
   wherein,
   in the anode, an anode active material layer comprising active material particles containing silicon (Si) is provided on an anode current collector, and
   at least some of the active material particles contain a polymer component in the active particle material, the polymer component effectively relaxing stress caused by expansion and shrinkage of the active material particles due to charge and discharge of current therethrough and preventing deformation of the anode active material layer and peeling of the anode active material layer from the anode current collector.

7. The battery according to claim 6, wherein the active material particles are formed by vapor-phase deposition method by using a polymer as part of raw materials.

8. The battery according to claim 6, wherein the active material particles contain at least one of a fluorocarbon resin and a polyimide as the polymer component.

9. The battery according to claim 6, wherein the active material particles contain a polyvinylidene fluoride as the polymer component.

10. The battery according to claim 6, wherein the anode active material layer is alloyed with the anode current collector in at least part of an interface with the anode current collector.

11. The battery according to claim 6, wherein the anode active material layer has a secondary particle formed from an aggregated plurality of the active material particles.

* * * * *